United States Patent Office 3,753,864
Patented Aug. 21, 1973

3,753,864
PRECIPITATING SOLUTION FOR
AMYLASE ASSAY
Arthur L. Babson and Susan R. Babson, Chester, N.J., assignors to Warner-Lambert Company, Morris Plains, N.J.
No Drawing. Filed Dec. 6, 1971, Ser. No. 205,294
Int. Cl. G01n 31/14
U.S. Cl. 195—103.5 R    4 Claims

ABSTRACT OF THE DISCLOSURE

A stable, temperature-independent precipitating agent solution comprising an aqueous solution of zinc chloride and ethylene glycol monoalkyl ether is provided for use in an improved amylase assay. In the assay, a fluid test sample containing an unknown concentration of amylase is incubated with a water-soluble, dyed starch substrate for a specified period of time, after which the precipitating agent solution of this invention is added to remove all dyed starch which has not been hydrolyzed by the amylase, and the optical density of the remaining supernatant fluid is measured to indicate amylase concentration in the test sample.

BACKGROUND OF THE INVENTION

The amylases are enzymes which catalyze the hydrolysis of starch. They may be of two types, $\alpha$-amylase or $\beta$-amylase, depending on the ability of the enzyme variety to hydrolyze certain linkages in the starch molecule. Starch itself is a polysaccharide comprising amylose fractions which have $\alpha$-1,4-linkages, and amylopectin fractions which have both $\alpha$-1,4 and $\alpha$-, 6 linkages. $\alpha$-Amylase can hydrolyze both the 1,4 and the 1,6 linkages of both amylose and amylopectin, while $\beta$-amylase is able to hydrolyze only the 1,4 linkage of the amylose fraction, leaving the 1,6 linkage of amylopectin unchanged.

The amylases of animal origin are of the $\alpha$-amylase type. Their presence has been shown in many tissues, but they are primarily produced by the pancreas and salivary glands. $\alpha$-Amylase is activated by the chloride ion and has been found to have optimum activity at a pH of about 7. The function of $\alpha$-amylase is to hydrolyze both the amylose and amylopectin fractions of starch in a random fashion, producing progressively smaller polysaccharide fragments which can be easily absorbed and assimilated into the body system.

The determination of amylase activity in body fluids is becoming increasingly important. Elevated amylase levels in blood serum have been observed in a number of pathological conditions, but the most spectcular rise in serum amylase levels has been seen in acuate pancreatitis where sudden increases to 30 or 40 times the normal level are not uncommon. In chronic pancreatitis, the increases are moderate and a substantial number of patients may actually have normal levels of amylase in their body fluids. Moderate elevations in serum amylase levels have also been seen in perforated peptic ulcer conditions and in intestinal obstruction disorders, wherein the increased amylase may be caused by leakage of the enzyme from the intestinal tract into the peritoneal cavity, followed by subsequent reabsorption from this cavity into the general circulation. Moderate elevations are also seen in mumps, renal insufficiency and cancer of the pancreas. Hepatobiliary disease is characterized by low levels of serum amylase.

Classical methods for the determination of amylase activity have been in use for a number of years. Recently, however, substantial improvements have been made in the reagents and methods used for the determination of amylase activity. For example, in U.S. Pat. No. 3,597,322, a method is disclosed wherein a water-soluble, dyed starch is incubated with the amylase containing test sample for a specified period of time, after which a temperature sensitive, alcoholic tannic acid precipitating agent is added to precipitate out all unhydrolyzed starch and protein, leaving a clear supernatant fluid upon which optical density measurements are taken. The alcoholic tannic acid solution must be at a temperature of from 20° C. to 30° C. before being added to the incubated test sample.

As a variation of the above procedure, there was described in Clin. Chem. 17: No. 4, pp. 311–315 (1971), by Sax, S. M. et al., a procedure whereby a dyed substrate, i.e., Procion Brilliant Red M-2BS-Amylopectin, is incubated with a sample of serum or urine for a specified period of time, after which all unhydrolyzed starch is removed by a two-step precipitation technique involving the addition, first, of ethylene glycol monomethyl ether, followed by the addition of a zinc sulfate solution; after the unhydrolyzed, dyed starch precipitant and protein are removed, optical density readings are taken on the remaining supernatant fluid.

While both of the above procedures are an improvement over previously used classical methods, it is readily apparent that there is still a need for an amylase assay utilizing a temperature independent one-step precipitation procedure wherein a preprepared, stable precipitating agent is provided.

SUMMARY OF THE INVENTION

In the determination of amylase activity in a fluid test sample, wherein the sample is incubated with a water-soluble, dyed starch substrate for a specified period of time, after which all unhydrolyzed dyed starch is precipitated out and optical density measurements of the remaining supernatant fluid indicates the concentration of amylase, there is provided a stable temperature-independent precipitating agent comprising an aqueous solution of zinc chloride and an ethylene glycol monoalkyl ether. The preferred precipitating agent solution contains 0.15% by weight zinc chloride and 76.4% by weight ethylene glycol monomethyl ether in distilled water, based on the weight of the entire solution.

DESCRIPTION OF THE INVENTION

The improved stable and temperature independent precipitating agent for use in the amylase assay procedure described in U.S. Pat. No. 3,597,322 can be prepared by incorporating these ingredients in water to yield the desired concentration.

The zinc chloride may be present in an amount of from 0.13% to 0.20% by weight, and preferably in an amount of from 0.14 to 0.18% by weight. The ethylene glycol monoalkyl ether may be present in an amount of from 58.0% to 87.0% by weight and preferably in an amount of from 74.4% to 77.4% by weight.

The ethylene glycol monoalkyl ether ingredient above may contain either a methyl or ethyl ether group. Of these, the ethylene glycol monomethyl ether is preferred.

A most preferred precipitating agent solution may be prepared to contain 0.15% zinc chloride and 76.4% ethylene glycol monomethyl ether in distilled water.

The fact that the precipitating agent solution of this invention is stable is quite unexpected. When zinc sulfate and ethylene glycol monomethyl ether, the two ingredients of the prior art precipitating agent (Clin. Chem. 17: No. 4, pp. 311–315, 1971) are combined, an unstable mixture results which greatly diminished the accuracy of the amylase assay. The two-step addition of the individual precipitating ingredients is, of course, undesirable for obvious reasons.

In the assay procedure of U.S. Pat. No. 3,597,322 the alcoholic tannic acid precipitating agent has the disadvantage of being temperature sensitive. The improved precipitating agent solution of our present invention is not sensitive to changes in temperature and will remove all unhydrolyzed dyed starch and any protein matter present in the fluid test sample at whatever temperature it is added. In the preferred procedure of this invention, the precipitating agent solution is added at room temperature, but it may be added at other temperatures with no untoward effects on the sensitivity or accuracy of the amylase assay.

Thus, the unusual stability, both in solution and with respect to temperature changes, of the precipitating agent solution of this invention, coupled with the accurate, sensitive results obtained in amylase determinations in which this solution is used, makes this invention a great improvement over prior art products and procedures.

In order to further illustrate the present invention, the following examples are given:

EXAMPLE 1

Preparation of purified dyed amylopectin 40 grams of amylopectin (Amioca Starch 51–6002) are dissolved in 1000 ml. of distilled water and stirred. 100 ml. of a 10% aqueous solution of Geigy Reactone Red 2B are added, followed by 100 ml. of 2.5 N NaOH solution, and batch is stirred until it becomes too viscous for stirring. The batch is covered and allowed to stand at room temperature (23° to 26° C.) for about 18 to 24 hours (overnight). Add 1 N hydrochloric acid (about 250 ml.), with stirring to neutralize the reaction mixture (pH of 7) then dilute with distilled water to a volume of 1900 ml. and mix well. This reaction mixture is passed through a Sephadex G-25 column having a minimum height of 15 cm. and a void volume of 1100 ml., to remove all unreacted dye. Water is used as the equilibrating liquid. Fractions of the purified dyed starch are collected until the unreacted dye starts to elute. The eluant of the column is monitored for the presence of the alcohol soluble dye. About 1400 ml. of useful substrate can be obtained. The solution thus obtained is then buffered to maintain a pH of about 7 by the addition of an 0.1 M phosphate buffer. A sufficient amount of NaCl is added to yield 0.005 M NaCl in the final solution.

EXAMPLE 2

Preparation of precipitating agent solution 790 ml. of ethylene glycol monomethyl ether are added to 228 ml. of distilled water. 1.5 grams of zinc chloride are added with mixing until the zinc chloride is dissolved.

EXAMPLE 3

Amylase assay using zinc chloride precipitating agent solution 0.2 ml. of a sample of blood serum is incubated with 1 ml. of the buffered soluble dyed substrate of Example 1 for 10 minutes at 37° C. At the end of this time, 5 ml. of the precipitating agent solution of Example 2 is added. The resulting precipitate is removed by centrifugation. The optical density of the remaining supernatant fluid is determined at a wavelength of 540 nm. The amount of amylase present in the unknown sample is proportional to the absorbance of the supernatant fluid.

We claim:
1. A method for the determination of amylase concentration in a fluid sample by
   (1) incubating the sample with a water-soluble dyed starch substrate in the presence of chloride ion, said substrate in the presence of chloride ion, said substrate being buffered to a pH of 6.5 to 7.8;
   (2) precipitating out all unhydrolyzed dyed substrate by the addition of a temperature-independent precipitating agent solution comprising an aqueous solution of:
      (A) from 58.0% to 87.0% by weight, based on the weight of the total solution, of an ethylene glycol monoalkyl ether selected from the group consisting of ethylene glycol monomethylether and ethylene glycol monoethyl ether; and
      (B) from 0.13% to 0.20% by weight, based on the weight of the total solution, of zinc chloride; and
   (3) reading the optical density of the remaining supernatant fluid.

2. A method according to claim 1 wherein the precipitating agent comprises an aqueous solution of:
   (A) from 74.4% to 77.4% by weight, based on the weight of the total solution, of the ethylene glycol monoalkyl ether; and
   (B) from 0.14% to 0.18% by weight, based on the weight of the total solution, of zinc chloride.

3. A method according to claim 2 wherein the ethylene glycol monoalkyl ingredient of the precipitating agent is ethylene glycol monomethyl ether.

4. A method according to claim 2 wherein the precipitating agent is an aqueous solution comprising:
   (A) 76.4% by weight, based on the weight of the total solution of ethylene glycol monomethyl ether; and
   (B) 0.15% by weight, based on the weight of the total solution, of zinc chloride.

References Cited

UNITED STATES PATENTS

| | | | |
|---|---|---|---|
| 3,251,748 | 5/1960 | High | 195—31 |
| 3,597,322 | 8/1971 | Babson | 195—103.5 R |

OTHER REFERENCES

Sax et al., "Clin. Chem.," 17(4): pp. 311–315 (1971).

ALVIN E. TANENHULTZ, Primary Examiner

M. D. HENSLEY, Assistant Examiner

UNITED STATES PATENT OFFICE
CERTIFICATE OF CORRECTION

Patent No. 3,753,864        Dated August 21, 1973

Inventor(s) Arthur L. Babson and Susan R. Babson

It is certified that error appears in the above-identified patent and that said Letters Patent are hereby corrected as shown below:

Column 1, line 53, "spectcular" should read -- spectacular --.

Column 1, line 54, "acuate" should read -- acute --.

Column 4, Claim 1, line 19, delete last word "said".

Column 4, Claim 1, line 20, delete the first seven words "substrate in the presence of chloride ion,".

Signed and sealed this 29th day of October 1974.

(SEAL)
Attest:

McCOY M. GIBSON JR.
Attesting Officer

C. MARSHALL DANN
Commissioner of Patents